United States Patent
Eguchi (12)

(10) Patent No.: US 8,416,460 B2
(45) Date of Patent: Apr. 9, 2013

(54) IMAGE PROCESSING APPARATUS AND CONTROL METHOD OF IMAGE FORMING APPARATUS WITH EXCLUSIVE OR RELATIVE CONTROL OVER THE TRAPPING AND EDGE SMOOTHING PROCESSING

(75) Inventor: Kimimori Eguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 516 days.

(21) Appl. No.: 12/716,143

(22) Filed: Mar. 2, 2010

(65) Prior Publication Data
US 2010/0238468 A1  Sep. 23, 2010

(30) Foreign Application Priority Data
Mar. 19, 2009  (JP) .................................. 2009-069009

(51) Int. Cl.
*H04N 1/58* (2006.01)
(52) U.S. Cl.
USPC .......................... 358/3.26; 358/518; 358/540
(58) Field of Classification Search .................. 358/501, 358/504, 518, 530, 532, 540, 3.26, 3.27; 382/162, 167, 260, 261, 264, 266, 269, 275
See application file for complete search history.

(56) References Cited

U.S. PATENT DOCUMENTS

| | | | |
|---|---|---|---|
| 5,771,318 A * | 6/1998 | Fang et al. ..................... | 382/261 |
| 7,196,816 B2 | 3/2007 | Watanabe | |
| 7,391,536 B2 * | 6/2008 | McElvain ...................... | 358/518 |
| 7,961,354 B2 * | 6/2011 | Eguchi .......................... | 358/3.27 |
| 2008/0055654 A1 | 3/2008 | Tamura ......................... | 358/3.26 |
| 2008/0145072 A1 | 6/2008 | Eguchi | |
| 2008/0247642 A1 | 10/2008 | Eguchi | |
| 2008/0259366 A1 | 10/2008 | Eguchi | |

FOREIGN PATENT DOCUMENTS

| | | |
|---|---|---|
| EP | 0718793 | 6/1996 |
| JP | 2003-87548 | 3/2003 |
| JP | 2004-237584 | 8/2004 |
| JP | 2006-244277 | 9/2006 |
| JP | 2008-061136 | 3/2008 |
| JP | 4-137067 | 8/2008 |

OTHER PUBLICATIONS

European Search Report dated Nov. 22, 2010 in EP 10156958.0.
Chinese Office Action dated Jul. 4, 2012 in corresponding Chinese Patent Appln. No. 2010-10139039.3, with English Translation.

* cited by examiner

*Primary Examiner* — Scott A Rogers
(74) *Attorney, Agent, or Firm* — Fitzpatrick, Cella, Harper & Scinto (57) ABSTRACT

When edge smoothing is applied to a portion where trapping was applied, the two processes are applied to a small region, thus causing image deterioration. Hence, the invention is configured to exclusively set trapping and edge smoothing execution conditions. Then, even when application of both trapping and edge smoothing processes to an entire image is selected, one of these processes is applied to each individual pixel or region. Alternatively, an execution completion flag may be set for one of these processes, and the other process may be executed with reference to that flag.

25 Claims, 9 Drawing Sheets

PRINTER SPECIFICATION SETTING

TRAPPING

- 601 — • TRAPPING　　[ON]　[OFF]
- 602 — • TRAPPING WIDTH　[0] [1] [2] [3]　pixels
- 603 — • TRAPPING DENSITY
  [0] [10] [20] [30] [40] [50] [60] [70] [80] [90] [100] %
- 604 — • DETAILED SETTING　[▷]

FIG. 6B

TRAPPING

DETAILED SETTING

TRAPPING ATTRIBUTE
- 611 — • PIXEL OF INTEREST　[TEXT] [GRAPHIC] 
- 612 — • REFERENCE PIXEL　[TEXT] [GRAPHIC]

TRAPPING APPLICATION DENSITY
- 613 — • PIXEL OF INTEREST　[0] [10] [20] [30] [40] [50] [60] [70] [80] [90] [100]
- 614 — • REFERENCE PIXEL　[0] [10] [20] [30] [40] [50] [60] [70] [80] [90] [100]

IMAGE PROCESSING APPARATUS AND CONTROL METHOD OF IMAGE FORMING APPARATUS WITH EXCLUSIVE OR RELATIVE CONTROL OVER THE TRAPPING AND EDGE SMOOTHING PROCESSING

BACKGROUND OF THE INVENTION

1. Field of the Invention

The present invention relates to an image processing apparatus, which is used to execute, for example, edge processing of an image object, and a control method of an image forming apparatus.

2. Description of the Related Art

Some electrophotographic image forming apparatuses include a function of executing trapping processing for slightly overlapping the boundaries of objects such as images, graphics, characters, and the like on different color plates, and edge smoothing processing for smoothing the edge of an object after dithering. The trapping processing is executed to prevent a blank (called a boundary gap) in the boundaries between objects formed by different color plates, by expanding the edge of at least one of the objects whose boundaries contact each other by a predetermined amount. Then, the objects overlap each other to prevent any boundary gap due to displacement of plates. The trapping processing is not executed unconditionally, and it is a common practice to decide whether or not to apply the processing according to the densities of the objects whose boundaries contact each other. This is because when the density of at least one of the objects whose boundaries contact each other is low, a boundary gap is not readily conspicuous if it is generated, and when the densities of both the objects are high, a boundary gap tends to be conspicuous. In addition, a technique for designating trapping for each page (for example, see Japanese Patent Laid-Open No. 2003-87548), and a technique for changing application conditions depending on attributes of objects (for example, see Japanese Patent Laid-Open No. 2004-237584) have been proposed.

The edge smoothing processing is executed to smooth jaggies of the edge (step-like edge) due to a screen structure visualized by dithering. In the edge smoothing processing, pixels are interpolated with reference to, for example, an original object so as to smoothly connect pixels of the edge of a target object after dithering. Since the edge smoothing processing is also executed for the density at which the screen structure tends to be conspicuous, whether or not to apply the processing is determined based on edge information of an object and, especially, density information of an edge portion. For example, when a density ranges from 0 to 255, since a screen structure due to dithering is conspicuous in a halftone object having a density=125, edge smoothing is applied to such object. By contrast, in case of an object whose density is low (e.g., a density=50), if the edge smoothing processing is applied after the dithering, the object is rimmed by the edge smoothing processing, and the density of that portion rises. In particular, when the original density is low, that density rise becomes conspicuous. Also, the jaggies of the edge portion of an object originally having a low density are not so conspicuous. Therefore, it is desirable not to apply edge smoothing to an object having a low density. For this reason, whether or not to apply edge smoothing is determined based on the density information of an object as in trapping (for example, see Japanese Patent No. 4137067).

Figure 10:
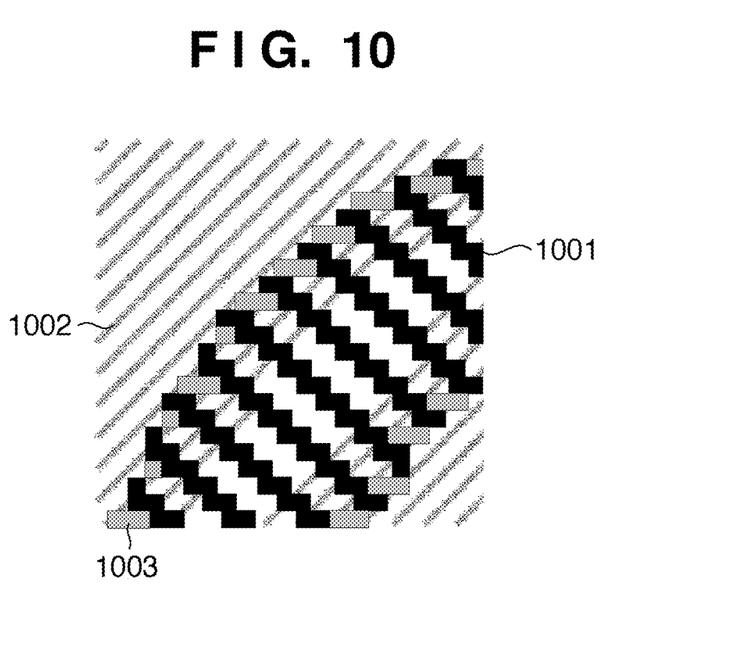
FIG. 10 is an enlarged view of an image that has undergone trapping and edge smoothing processes.

In this way, both the trapping and edge smoothing processes are applied to enhance the image quality. However, when these processes are used together, various adverse effects occur. For example, by applying the trapping processing, the edges of objects whose boundaries contact each other shift to intrude each other's edges, thus overlapping the objects. This result is inevitably generated by the trapping processing. When the edge smoothing processing is applied to these objects, the edges of the two objects whose boundaries contact each other undergo the edge smoothing processing. For this reason, double edges appear, and these are further emphasized by the edge smoothing processing. Even if the type of a target object of the edge smoothing processing is limited to a character, the edge portion inevitably deteriorates. FIG. 10 shows this example. A character object 1001 and background object 1002 overlap each other near their boundaries as a result of the trapping processing. Then, the edge smoothing processing interpolates pixels 1003 at the edge of the character object that has undergone dithering. In this manner, the edges of regions to which both the trapping and edge smoothing processes are applied are especially excessively emphasized, resulting in considerable image deterioration.

SUMMARY OF THE INVENTION

The present invention has been made in consideration of the aforementioned related arts, and provides an image processing apparatus which can prevent image quality from deteriorating by selectively applying one of trapping and edge smoothing processes to one edge or its portion even when the trapping and edge smoothing processes are applied to one image, and a control method of an image forming apparatus.

The present invention in its first aspect provides an image processing apparatus, which generates image data, an image of which is formed by overlapping color plates of at least two colors, comprising: a trapping processor, configured to apply trapping processing to an object which belongs to either of the color plates of the at least two colors; and a smoothing processor, configured to apply edge smoothing processing to an object which belongs to either of the color plates of the at least two colors, wherein the trapping processing by the trapping processor and the edge smoothing processing by the smoothing processor are exclusively controlled for respective pixels or regions, or a degree of intensity of trapping processing by the trapping processor and a degree of intensity of the edge smoothing processing by the smoothing processor are relatively controlled for respective pixels or regions.

According to the present invention, even when the trapping and edge smoothing processes are applied to one image, a satisfactory image which can take advantages of image enhancements by the respective processes can be obtained.

Further features of the present invention will become apparent from the following description of exemplary embodiments with reference to the attached drawings.

DESCRIPTION OF THE EMBODIMENTS

[First Embodiment]

Figure 1:
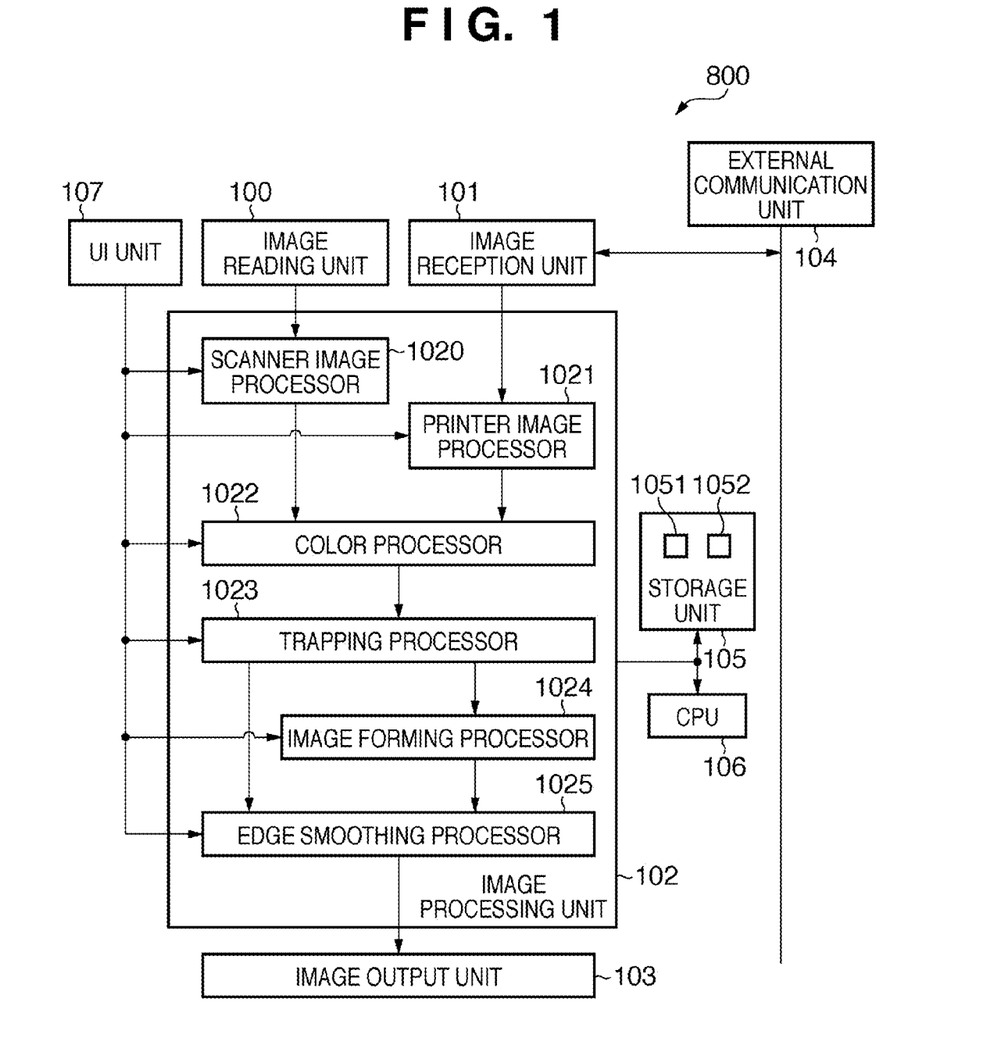
FIG. 1 is a schematic block diagram of an image forming apparatus according to an embodiment of the present invention.

Details of image processing in an image forming apparatus according to an embodiment of the present invention will be described hereinafter with reference to the drawings. FIG. 1 is a schematic block diagram of an image forming apparatus according to the first embodiment of the present invention. Although this embodiment assumes a digital multifunction peripheral as an image forming apparatus, the present invention can use other print devices such as a color printer in addition to a copying machine. The structure of the image forming apparatus according to this embodiment will be described first. As shown in FIG. 1, an image forming apparatus 800 includes an image reading unit 100, image reception unit 101, UI unit 107, image processing unit 102 which executes various image processes, storage unit 105, CPU 106, and image output unit 103. Note that the image forming apparatus 800 can be connected to a server which manages image data, a personal computer (PC) which issues a print execution instruction to this image forming apparatus, and the like via a network such as a LAN or Internet. Also, the image forming apparatus 800 can be connected to an external communication unit 104 via the image reception unit 101. The image processing unit 102 can be configured as an independent image processing apparatus having only image processing functions using a computer or the like.

The functions of the respective units of the image forming apparatus shown in FIG. 1 will be described below. The image reading unit 100 has, for example, an image scanner, and reads an image from, for example, a paper document. For example, the image reading unit 100 reads an RGB color image. The read RGB data is sent to the image processing unit 102. A scanner image processor 1020 applies image processes such as shading correction, block separation processing, and color conversion to the RGB color image data read by the image reading unit 100.

The image reception unit 101 receives image data described in a page description language (PDL) (PDL image data) via, for example, a communication line. The PDL image data is a set of commands which describe objects that form an image. Note that the image forming apparatus 800 can receive image data expressed by a command group associated with individual objects that form an image and can form an image of that image data, in addition to the PDL image data. A case will be exemplified below wherein the PDL image data is received. The PDL image data input to the image reception unit 101 is sent to a printer image processor 1021. An interpreter included in the printer image processor 1021 interprets a command group of the PDL image data, and outputs intermediate code data. A RIP (raster image processor) included in the printer image processor 1021 rasterizes the intermediate code data to a bitmap image. The bitmap image data generated by the RIP has tones before quantization, and is called a continuous tone image or contone image. On the other hand, the printer image processor 1021 rasterizes pieces of attribute information (graphic attribute, color attribute, picture attribute, text attribute, thin line attribute, etc.) for respective pixels from attribute information included in the command group. That is, each attribute information indicates a type of an object, and an attribute map indicating the types of objects to each of which a pixel of interest belongs for respective pixels is generated in association with the bitmap image data. Images obtained by the scanner image processor 1020 and printer image processor 1021 can be temporarily stored in the storage unit 105 (to be described later) (BOX function). When the user selects a desired image from the stored image group using the UI unit 107, subsequent processes are applied to the selected image, and the processed image is output from the image output unit 103.

A color processor 1022 accepts data from the image reading unit 100 or image reception unit 101, and executes, for example, RGB→CMYK color conversion processing. That is, the color processor 1022 converts a color system according to an input image into that of image data, an image of which is formed by the image forming apparatus 800. Furthermore, a trapping processor 1023 applies trapping to CMYK image data, and an image forming processor 1024 then applies dithering. In the trapping and dithering, pixels which belong to a target object are specified with reference to the attribute map, and the processes are applied to the specified pixels. Finally, an edge smoothing processor 1025 executes edge smoothing processing based on contone image data before the dithering and screen image data after the dithering. The contone image data is input from the trapping processor 1023, and the screen image data is input from the image forming processor 1024.

The arrangements and functions of the storage unit 105, CPU 106, and image output unit 103 of the image forming apparatus shown in FIG. 1 will be described below. The storage unit 105 includes various storage media such as a random access memory (RAM), read-only memory (ROM), and hard disk. For example, the RAM is used as an area for storing data and various kinds of information, and also as a work area of the CPU 106. Furthermore, the storage unit 105 often includes a nonvolatile rewritable memory. For example, this memory includes a trapping setting save area 1051 which saves trapping settings, and an edge smoothing setting save area 1052 which saves edge smoothing settings. The trapping settings include conditions required upon application of trapping processing to a pixel of interest. The edge smoothing settings include conditions required upon application of edge smoothing processing to a pixel of interest. Note that these save areas may be included in the trapping processor and edge smoothing processor, which refer to these areas. On the other hand, the ROM is used as an area for storing various control programs. The CPU 106 is used to judge and control various kinds of processes according to the programs stored in the ROM. The image output unit 103 has a function of outputting an image (for example, a function of forming an image on a print medium such as a print paper sheet and outputting the image). An image deformation processing method for bitmap image data after the RIP processing has been described. Note that the invention of this embodiment can be applied to, for example, the trapping processing which is applied to object data in the RIP. When the trapping processing is applied to object data in the RIP, the printer image processor 1021 executes that processing.

Figure 8:
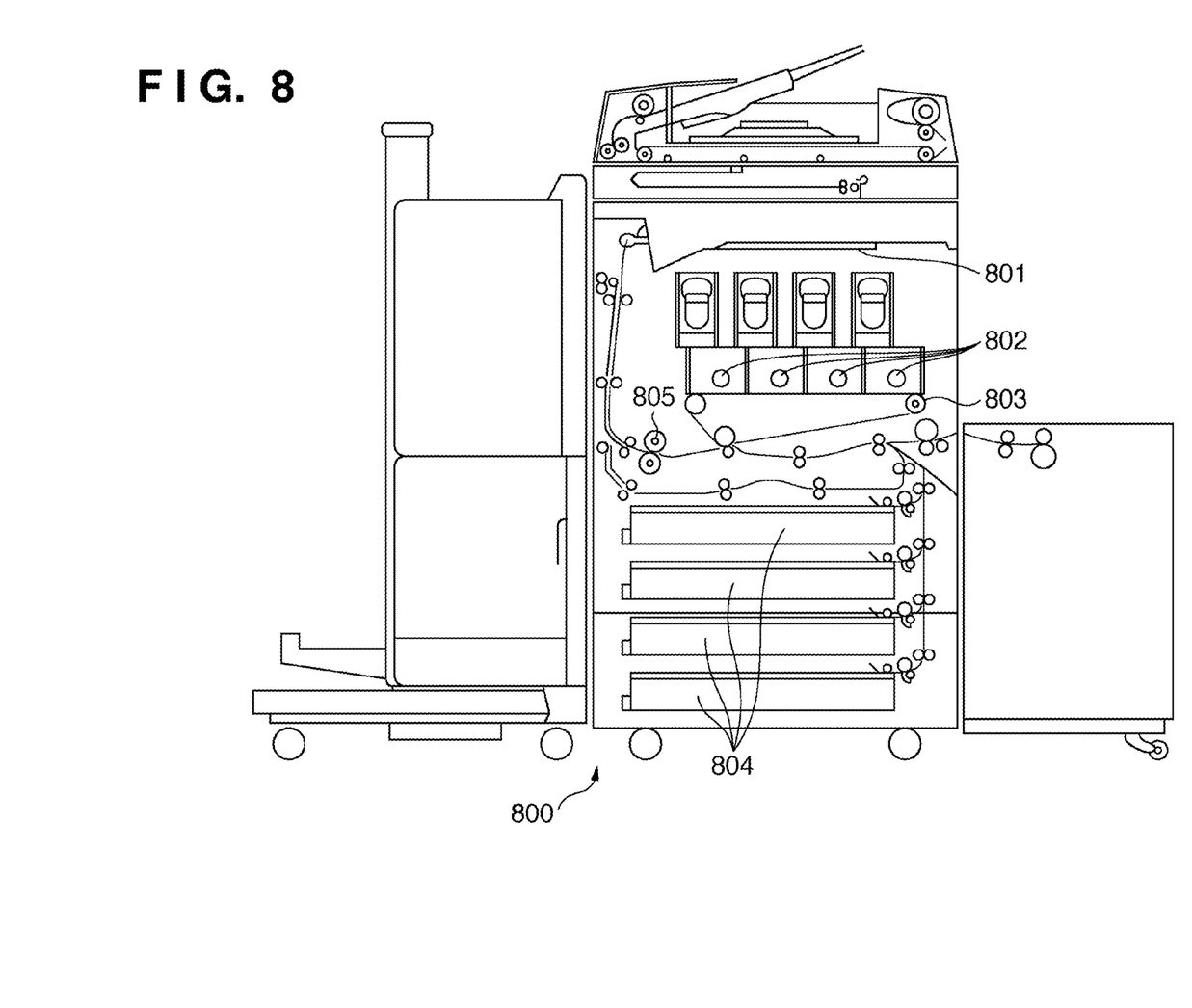
FIG. 8 is a sectional view illustrating the hardware arrangement of an image reading unit 100 and image output unit 103 of the image forming apparatus shown in FIG. 1.

FIG. 8 is a view illustrating the hardware arrangement of the image reading unit 100, image reception unit 101, and image output unit 103 of the image forming apparatus 800 such as a digital multifunction equipment shown in FIG. 1, that is, a sectional view of the image forming apparatus. A controller 801 includes the image processing unit 102 in FIG. 1, and also has a function of controlling the overall image forming apparatus. The image forming apparatus 800 has copy, printer, and FAX functions. The image forming apparatus 800 has a structure for forming an image by overlapping color plates of at least two colors. For this purpose, the image forming apparatus 800 has image forming units 802 for respective color components. Each image forming unit 802 forms a toner image developed by a color recording material such as toner for each color component of image data. The formed toner images of the respective color components are transferred onto an intermediate transfer belt 803. For this reason, the images of the respective color components (i.e., color plates) are overlaid with each other on the intermediate transfer belt 803 to form a full-color image. The number of color components of an image formed by the image forming units 802 are often two or three depending on apparatuses, and five or more colors may be employed. Color image data formed in this way is transferred onto a paper sheet conveyed from each tray 804, and is heated and fixed on the sheet by a fixing device 805. Then, the paper sheet is exhausted on an exhaust tray.

<Trapping Processing>

Processing steps from the trapping processor 1023 to the edge smoothing processor 1025 in FIG. 1 will be described below. Details of the processing by the trapping processor 1023 shown in FIG. 1 include processing steps shown in FIG. 2. A trapping ON/OFF determination process (S201) determines for image data input from the color processor 1022 whether or not a trapping setting is ON. This setting is input using the UI unit 107, and is saved in the trapping setting save area 1051. As a result of determination in step S201, if the trapping setting is OFF, the trapping processing ends (S208). On the other hand, if the trapping setting is ON, the subsequent processes are executed while sequentially updating a pixel of interest pixel by pixel. That is, the process advances to a pixel of interest attribute determination process (S202) first. The pixel of interest attribute determination process (S202) determines whether or not the attribute of a pixel of interest is an attribute which is set by the UI unit 107 and is saved in the trapping setting save area 1051. Note that the attribute of the pixel of interest can be obtained by acquiring an attribute value associated with that pixel with reference to the attribute map. Note that the attribute can also be called a type of an object. If it is determined that the two attributes match, the process advances to a next surrounding pixel attribute determination process (S203). Note that the trapping processing is processing which copies a surrounding pixel, which belongs to a neighboring object of an object to which the pixel of interest belongs, to the position of the pixel of interest. In this sequence, a surrounding pixel is also called a reference pixel.

Figure 2:
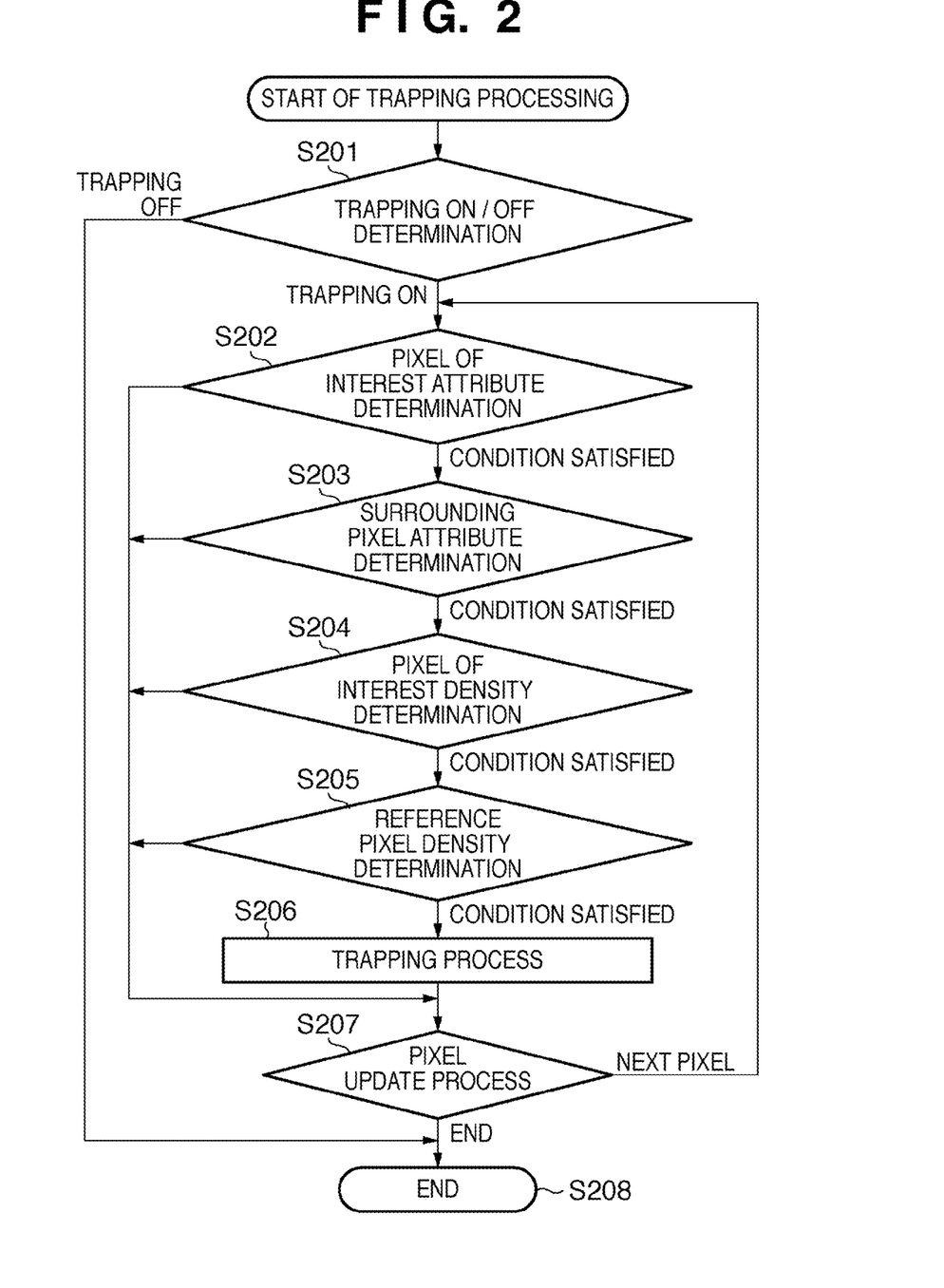
FIG. 2 is a flowchart of a trapping processor.

The surrounding pixel attribute determination process (S203) determines whether or not a surrounding pixel of the pixel of interest has the same attribute as that which is set by the UI unit 107 and is saved in the trapping setting save area 1051. If it is determined that the surrounding pixel has the same attribute, the process advances to a next pixel of interest density determination process (S204). The pixel of interest density determination process (S204) determines whether or not the density of the pixel of interest falls within a first reference density range, which is set by the UI unit 107 and is saved in the trapping setting save area 1051. If the density of the pixel of interest falls within the first reference density range, the process advances to a next reference pixel density determination process (S205). The reference pixel density determination process (S205) determines if the density of the reference pixel falls within a second reference density range which is set by the UI unit 107 and is saved in the trapping setting save area 1051. If the density of the reference pixel falls within the second reference density range, the process advances to a trapping process (S206) to apply trapping to the pixel of interest. That is, only when the pixel of interest satisfies all trapping processing execution conditions, the trapping processing is executed. When any of the execution conditions is not satisfied in the determination processes from the pixel of interest attribute determination process (S202) to the reference pixel density determination process (S205), the process jumps to a pixel update process (S207) without executing the trapping process (S206). In the pixel update process (S207), the pixel of interest is moved to the next pixel if the next pixel is available, and the process returns to the pixel of interest attribute determination process (S202). If no next pixel is available, the processing ends. The next pixel can be decided in, for example, a raster order.

After the trapping processor 1023, the image forming processor 1024 applies dithering, and the control then transitions to the edge smoothing processor.

<Edge Smoothing Processing>

Figure 3:
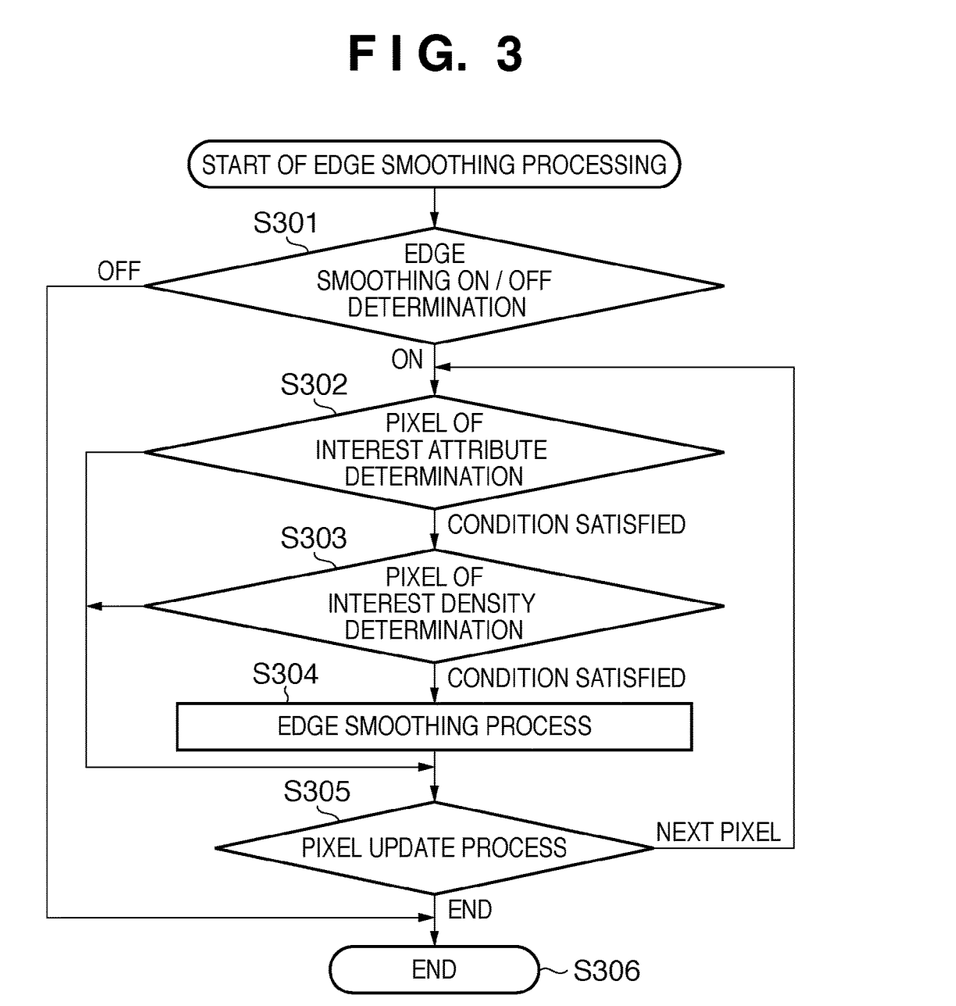
FIG. 3 is a flowchart of an edge smoothing processor.

Details of the processing by the edge smoothing processor include processing steps shown in FIG. 3. Output image data are respectively input from the trapping processor 1023 and image forming processor 1024, and an edge smoothing ON/OFF determination process (S301) determines whether or not an edge smoothing setting is ON. This setting is input by the UI unit 107, and is saved in the edge smoothing setting save area 1052. As a result of determination, if the edge smoothing setting is OFF, the edge smoothing processing ends (S306). On the other hand, if the edge smoothing setting is ON, the subsequent processes are executed while sequentially updating a pixel of interest pixel by pixel. That is, the process advances to a pixel of interest attribute determination process (S302). The pixel of interest attribute determination process (S302) determines whether or not the attribute of the pixel of interest is the same attribute as that which is set by the UI unit 107 and is saved in the edge smoothing setting save area 1052. If it is determined that the pixel of interest has the same attribute, the process advances to a next pixel of interest density determination process (S303). The pixel of interest density determination process (S303) determines whether or not the density of the pixel of interest falls within a third reference density range which is set by the UI unit 107 and is saved in the edge smoothing setting save area 1052. If the density of the pixel of interest falls within the third reference density range, the process advances to an edge smoothing process (S304) to apply edge smoothing to the pixel of interest. That is, only when the pixel of interest satisfies all the edge smoothing processing execution conditions, the edge smoothing processing is executed. If any of execution conditions is not satisfied in the determination processes of the pixel of interest attribute determination process (S302) and the pixel of interest density determination process (S303), the process jumps to a pixel update process (S305) without executing the edge smoothing process (S304). After that, in the pixel update process (S305), the pixel of interest is moved to the next pixel if the next pixel is available, and the process returns to the pixel of interest attribute determination process (S302). If no next pixel is available, the processing ends.

The processing steps from the trapping processor 1023 to the edge smoothing processor 1025 in FIG. 1 have been described.

<Setting of Trapping Processing>

The basic and detailed setting methods of the trapping and edge smoothing functions by the UI unit 107 will be described below. Trapping basic settings will be described first with reference to FIG. 6A.

Figure 6A:
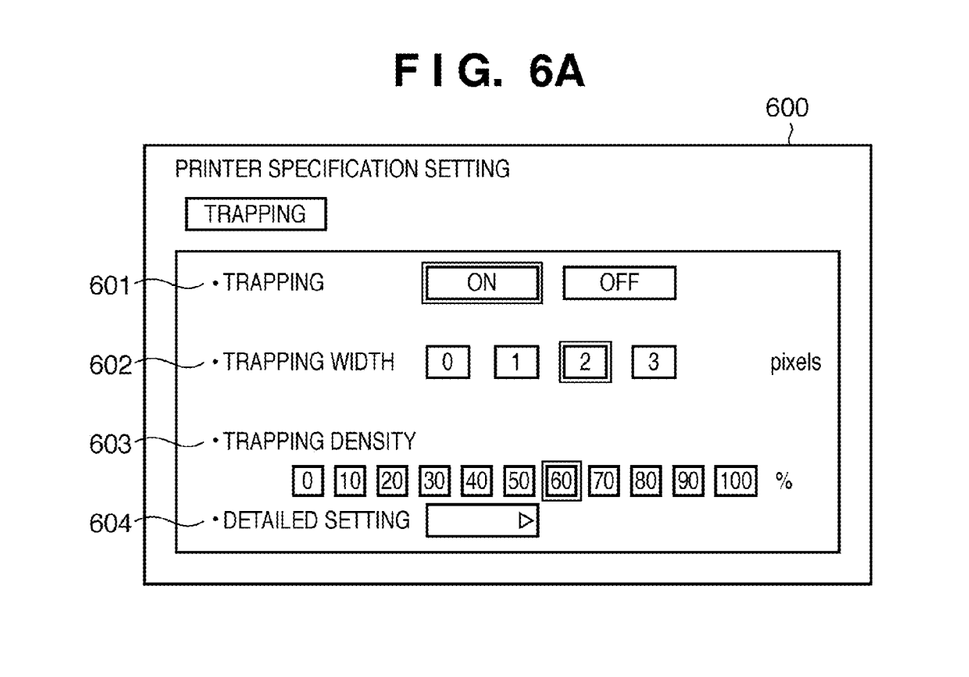
FIGS. 6A and 6B are views showing trapping UIs.
Figure 6B:
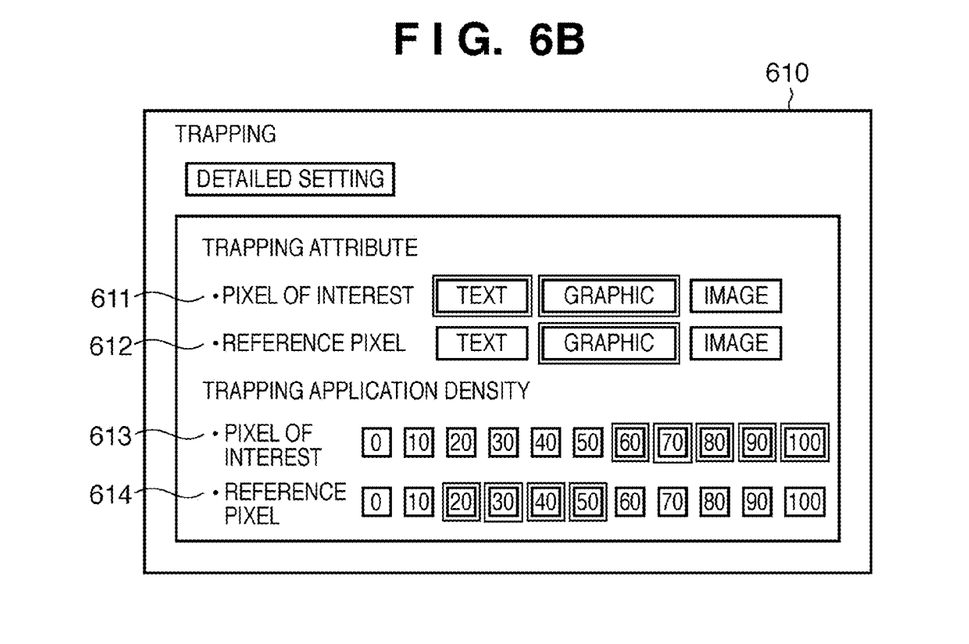

When the user inputs a trapping processing setting instruction, a user interface 600 shown in FIG. 6A is displayed. On this user interface 600, the user selects trapping ON or OFF from trapping ON/OFF buttons 601. The user selects a trapping width from trapping width selection buttons 602, and also selects from trapping density buttons 603 a density of a region to be extended by the trapping processing, that is, a density of a region that may overlap a neighboring object. Furthermore, when the user selects a detailed setting button 604, a UI window shown in FIG. 6B is displayed, and he or she makes detailed settings on this window.

The trapping detailed settings will be described below with reference to FIG. 6B. Note that button selections are made by the user in the following description. Attributes to which trapping is to be applied to a pixel of interest and reference pixels are respectively selected using selection buttons 611 and 612. This attribute is selected from object types such as text, graphic, and image. Selectable object types include those which are distinguished by commands of the PDL image data or those which are distinguished by the aforementioned block separation processing executed by the image forming apparatus. A trapping application density range, that is, a density range (i.e., the first density range in FIG. 2) of the pixel of interest to which trapping is applied is designated using buttons 613. In this case, by selecting a minimum density (0) and maximum density (100), it is set to apply trapping to densities between these densities. A density range (i.e., the second density range in FIG. 2) of the reference pixel is similarly set using buttons 614.

The trapping processing execution conditions set by the user via the aforementioned user interfaces are saved in the trapping setting save area 1051. This corresponds to first condition acceptance means which accepts and saves the trapping processing execution conditions.

<Edge Smoothing Processing Condition>

Figure 7A:
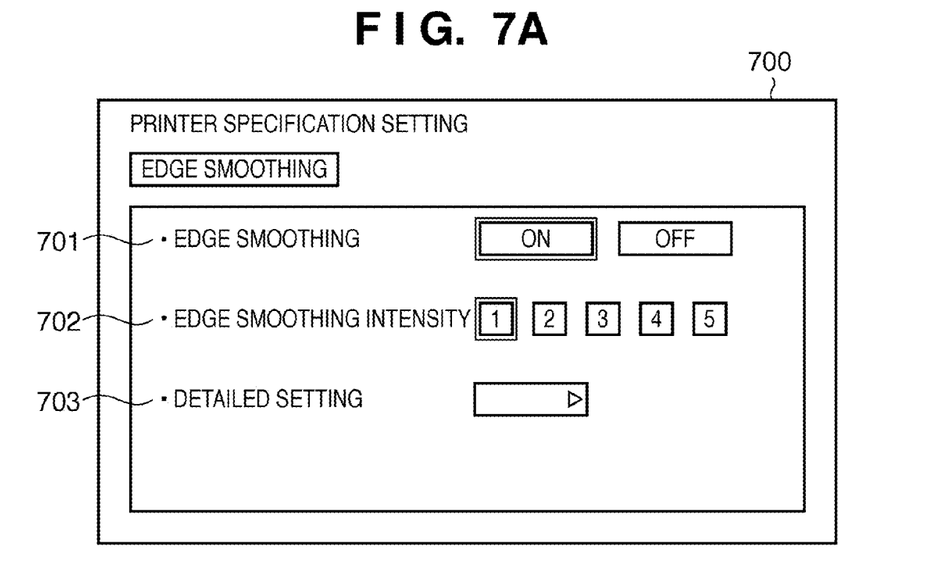
FIGS. 7A and 7B are views showing edge smoothing UIs.

Edge smoothing basic settings will be described below with reference to FIG. 7A. Note that selections are made by the user. Edge smoothing ON or OFF is selected from edge smoothing ON/OFF buttons 701. An edge smoothing intensity is selected from selection buttons 702 to decide a border density. In FIG. 7A, assume that a value "1" sets a lowest density (i.e., weakest smoothing), and a value "5" sets a highest density (i.e., strongest smoothing). Furthermore, upon selection of a detailed setting button 703, a UI window in FIG. 7B appears, and allows the user to make detailed settings on this window.

Figure 7B:
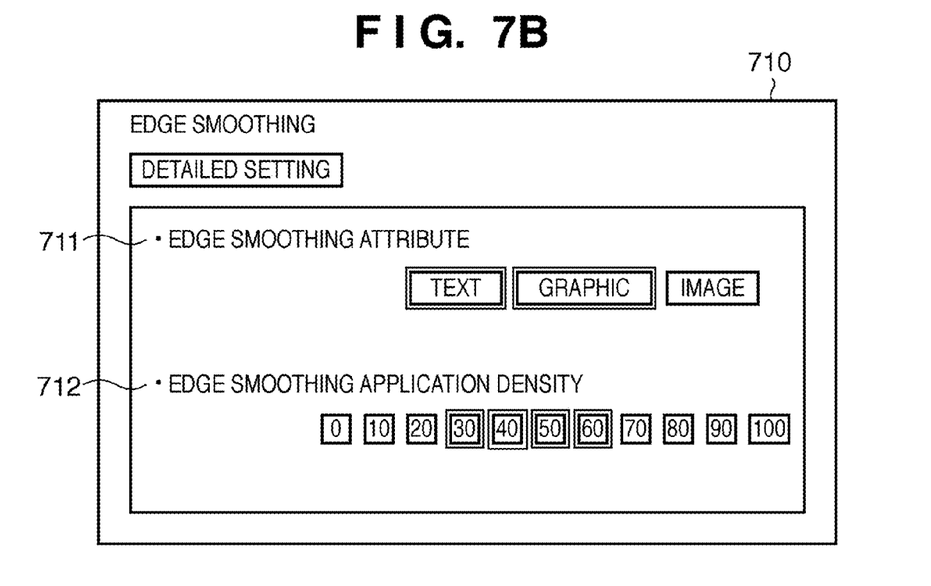

Edge smoothing detailed settings will be described below with reference to FIG. 7B. An attribute to which edge smoothing is to be applied is selected from selection buttons 711 to select an object type such as text, graphic, or image. Next, an edge smoothing application density range, that is, a density range (i.e., the third density range in FIG. 3) within which edge smoothing is executed is designated using buttons 712. In this case as well, by selecting minimum and maximum densities, it is set to apply edge smoothing to densities between these densities. This corresponds to second condition acceptance means which accepts and saves the edge smoothing processing execution conditions.

Figure 4:
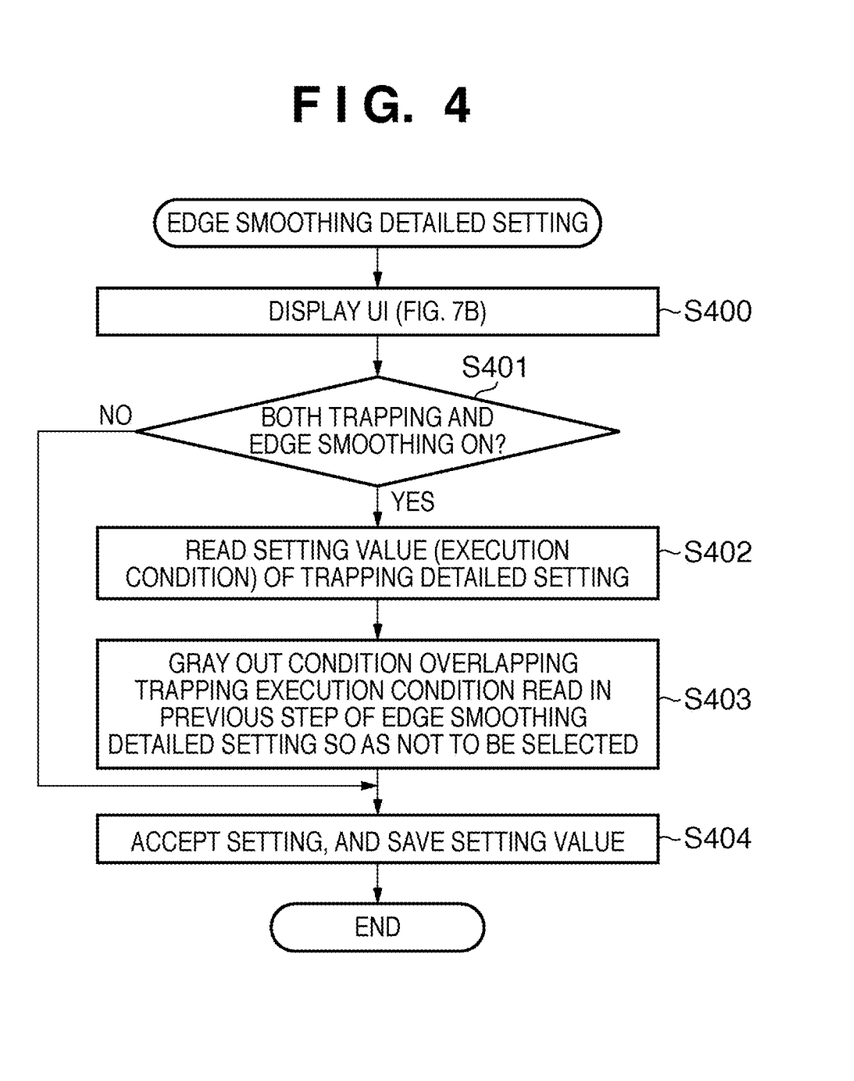
FIG. 4 is a flowchart of setting acceptance processing required to implement exclusive control of trapping and edge smoothing processes according to the first embodiment.

The processing sequence executed upon selection of the button 703 in FIG. 7A will be described below with reference to FIG. 4. Initially, the user interface window shown in FIG. 7B is displayed (S400). At this time, if arbitrary settings have already been made, these setting values are read out from the edge smoothing setting save area 1052 and are displayed. It is checked if both the trapping and edge smoothing functions are simultaneously selected (S401). This determination process is implemented by referring to the trapping setting save area 1051 and edge smoothing setting save area 1052. In this case, if settled values have not been saved yet, temporarily saved settings are referred to. If it is set to apply both the functions, the setting values of respective trapping detailed setting items, that is, the execution conditions are read from the trapping setting save area (S402). For example, the density range of the pixel of interest to which trapping is to be applied is read. Then, items and values of conditions, which overlap the trapping execution conditions read in step S402, of the edge smoothing conditions on the user interface window shown in FIG. 7B are re-displayed in a selection disabled state. For example, these items and values are grayed out. For example, when the density is limited as an execution condition, the density range set as the trapping execution condition is displayed on the user interface so as not to be selected as the edge smoothing execution condition. In this state, user settings are accepted, and the accepted setting values are saved (S404).

In this manner, by limiting trapping or edge smoothing application conditions so as not to overlap each other at the time of settings of these execution conditions, trapping and edge smoothing can be avoided from being doubly applied to the same pixel or region. That is, exclusive control can be executed. Then, image quality deterioration due to application of both the processes can be prevented. Furthermore, a trapping effect is generally less conspicuous for a portion where the pixel of interest has a higher density, and edge smoothing is generally effectively applied to a portion where the pixel of interest has a density ranging from a low density to a middle density. By selectively using the processes depending on density ranges, that is, trapping for a range from a middle density to a high density and edge smoothing for a range from a low density to a middle density, a high-quality image which makes good use of their original features can be generated.

Note that execution condition is limited in such a manner that, for example, when the trapping application density range is set as a range from 60% to 100% on the trapping UI, the edge smoothing application density values from 70% to 100% are grayed out so as not to be selected on the edge smoothing UI. In this state, this seems to allow an overlapping range from 60% to 70% on the display. However, in this example, this is a limitation in terms of display since the density values are displayed in increments of 10%. Strictly speaking, it is desirably set to execute trapping when the density of the pixel of interest falls within a range from 61% to 100%, and to execute edge smoothing when the density of the pixel of interest falls within a range from 31% to 60%.

As the execution condition of the edge smoothing processing, the type of an object to be processed may be limited in place of or in addition to the density. When only a text attribute is designated as that to which the trapping processing is applied, a text attribute as the trapping processing execution condition may be inhibited from being selected in the detailed settings on the edge smoothing UI.

The case has been explained wherein the trapping processing execution conditions are set first, and the edge smoothing execution conditions are then set. By contrast, when the edge smoothing settings are made first, items and values selected as the edge smoothing execution conditions may be grayed out so as not to be selected when the trapping processing settings are to be made, thus achieving the same object.

In the above example, the user selects conditions by means of buttons, but may directly input numerical values. Note that the aforementioned settings may be made either when an administrator sets as default settings of the image forming apparatus at the time of initial settings or every time the user performs image formation.

When the settings are made every time the user performs image formation, an image to be formed is read out from the aforementioned BOX, and the UI unit 107 displays a preview display image during or at the time of completion of the settings in FIGS. 6A to 7B. Then, the settings are reflected to identifiably display regions to which trapping and edge smoothing are to be applied. With this display, respective regions to which trapping and edge smoothing are to be applied may be displayed to have different patterns so as to be easily identified, or trapping and edge smoothing simulation images to which the settings are reflected may be displayed.

[Second Embodiment]

Figure 5A:
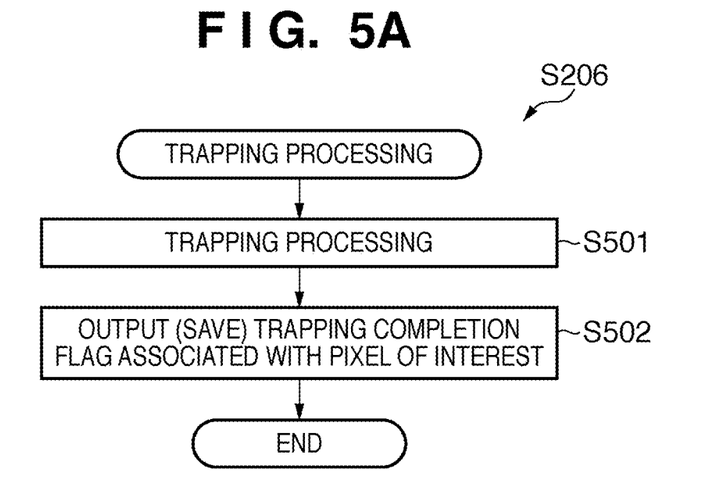
FIGS. 5A and 5B are flowcharts of trapping and edge smoothing processes required to implement exclusive control of the trapping and edge smoothing processes according to the second embodiment.
Figure 5B:
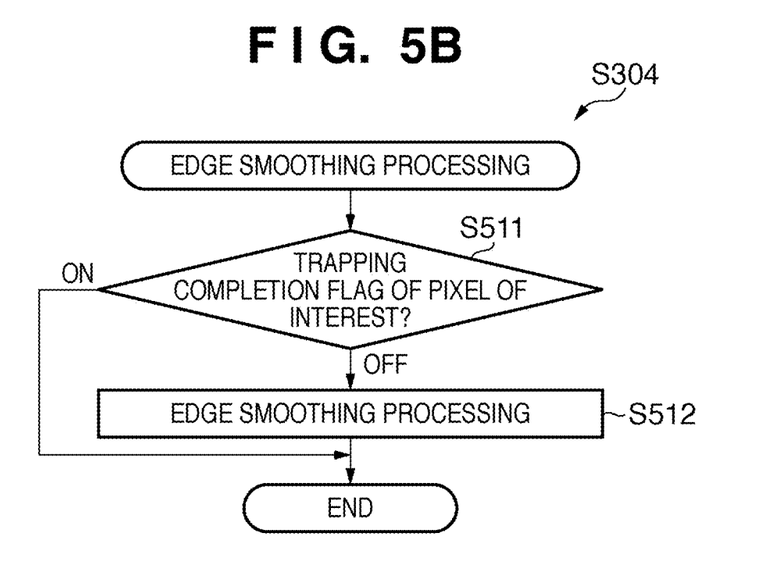

The second embodiment will explain a system which automatically executes exclusive control so that the user can have a merit even when he or she does not execute exclusive control in detailed settings. The arrangements and operations of the first embodiment except for the sequence explained using FIG. 4 are common to this embodiment. The sequence in FIG. 4 may or may not be executed. A difference from the first embodiment lies in the operations by a trapping processor and edge smoothing processor, and FIGS. 5A and 5B show their sequences.

Trapping processing will be described below with reference to FIG. 5A. This sequence corresponds to detailed processes in this embodiment of step S206 shown in FIG. 2. As in the first embodiment, normal trapping processing is applied to a pixel of interest (S501). After that, a trapping completion flag is generated in association with the pixel of interest, so as to pass the control to the edge smoothing processor (S502). Of course, the generated flag may be temporarily saved in, for example, a memory as partial information of the aforementioned attribute map in place of directly passing the control.

On the other hand, edge smoothing will be described below with reference to FIG. 5B. This sequence corresponds to detailed processes of this embodiment of step S304 shown in FIG. 3. The trapping completion flag associated with a portion where trapping was applied, for example, a pixel or region, is referred to (S511). If the flag is set, edge smoothing is skipped; otherwise, edge smoothing processing is applied (S512).

Figure 9:
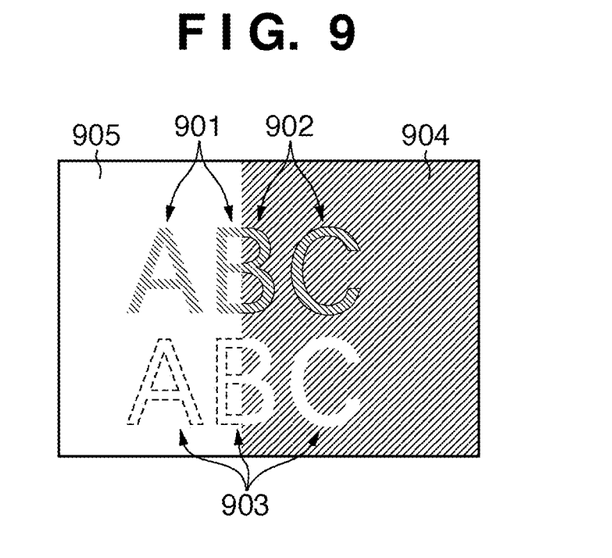
FIG. 9 is a view exemplifying portions having good effects of the present invention.

In the second embodiment, for example, with respect to image data shown in FIG. 9, a trapping processor 1023 applies trapping to boundaries 902 between the edges of character objects "C" and "B" and a background object 904. That is, trapping processing is applied to a boundary where a density of at least one of a background and foreground (character in this case) whose boundaries contact each other is equal to or higher than, for example, a predetermined density. The trapping processing in this case can be implemented by expanding an object with the predetermined density (for example, the background object 904) toward the other object (for example, the character object) side at a boundary with the other object. Of course, these objects may be exchanged to apply the processing. However, in this case, the edge of even one object may include both trapping and non-trapping portions depending on the density of the neighboring object. On the other hand, trapping is not applied to a character object portion without any background and a character object 903 with a low background density. That is, when the densities of both objects whose boundaries contact with each other are equal to or lower than the predetermined density, trapping is skipped.

An edge smoothing processor 1025 does not apply edge smoothing to the portions 902 to which trapping was applied.

On the other hand, the edge smoothing processor 1025 applies edge smoothing to non-trapping portions 901 and 903, that is, to portions where the density of at least one of a background and foreground (character in this case) whose boundaries contact each other is lower than, for example, a predetermined density.

In this manner, pixels or regions which have undergone the trapping processing are controlled not to be selected as edge smoothing processing targets, thus limiting the edge processes to be applied to one process. As a result, any boundary gap upon displacement of color plates can be prevented by applying the trapping processing. On the other hand, edge smoothing can be effectively applied to a portion where screen jaggies stand out.

Note that this embodiment inhibits trapping and edge smoothing from being applied to one portion at the same time. However, image deterioration at an edge portion can also be prevented by weakly applying edge smoothing. That is, such processes can be implemented by making the following settings. That is, for a portion where the trapping completion flag is set, the setting intensity of rimming an object in edge smoothing UI settings is set to be "1" irrespective of user settings. On the other hand, edge smoothing having an intensity equivalent to "4" is applied to a non-trapping portion.

In the above two embodiments, the trapping processing is executed in preference to the edge smoothing processing, but the edge smoothing processing may be preferentially executed. In this case, in the first embodiment, when the edge smoothing processing execution conditions have already been set, the same conditions as these conditions cannot be set as the trapping processing execution conditions. For this reason, the corresponding conditions are grayed out on, for example, the UI. In the second embodiment, the order of the trapping and edge smoothing processes is reversed to execute the edge smoothing processing first, and a flag is generated in association with the processed pixel. Then, at the time of the trapping processing, that flag is referred to. When the flag is set, the trapping processing is skipped even when the conditions are satisfied. The exclusive control can also be implemented in this way. Also, the first and second embodiments may be combined. In this example, since the trapping processing is executed before dithering and the edge smoothing processing is executed after dithering, the trapping processing is preferentially executed. However, when the trapping processing is applied to image data after dithering, the edge smoothing processing can be preferentially executed, as described above. The first and second embodiments have exemplified the case in which the edge smoothing processing is applied to an image after dithering. Alternatively, the exclusive control may be executed upon application of trapping and edge smoothing to an image after error diffusion as halftoning different from dithering. Also, the preview function described in the last paragraph of the first embodiment may be executed in the second embodiment.

The image forming apparatus shown in FIG. 8 adopts a so-called tandem-drum engine. Alternatively, the present invention can also be applied to an image forming apparatus which adopts a single-drum engine in which image forming units sequentially contact an intermediate transfer member to transfer and overly toner images of respective color components. Also, the present invention is not limited to an electrophotography system, and can also be applied to image forming apparatuses of other systems.

In the above example, the execution conditions of the trapping and edge smoothing processes are determined for respective pixels, but they may be determined for each region having a given size. In this case, the execution conditions are set or an execution completion flag of, for example, the trapping processing is set in association with that region.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-069009, filed Mar. 19, 2009, which is hereby incorporated by reference herein in its entirety.

What is claimed is:

1. An image processing apparatus, which generates image data, an image of which is formed by overlapping color plates of at least two colors, comprising:
   a trapping unit configured to apply trapping processing to an object which belongs to either of the color plates of the at least two colors; and
   a smoothing unit configured to apply edge smoothing processing to an object which belongs to either of the color plates of the at least two colors, whereby as a result of such edge smoothing processing at least a portion of the object is rimmed,
   wherein the trapping processing by the trapping unit and the edge smoothing processing by the smoothing unit are exclusively controlled for respective pixels or regions.

2. The apparatus according to claim 1, further comprising:
   a first condition acceptance unit, configured to accept and save an execution condition upon application of the trapping unit; and
   a second condition acceptance unit, configured to accept and save an execution condition upon application of the smoothing unit,
   wherein the first and second condition acceptance unit are configured such that an execution condition which overlaps the execution condition saved by one of the condition acceptance unit is not accepted as an execution condition by the other one of the condition acceptance unit, and
   the trapping unit executes the trapping processing according to the execution condition saved by the first condition acceptance unit, and the smoothing unit executes the edge smoothing processing according to the execution condition saved by the second condition acceptance unit.

3. The apparatus according to claim 2, wherein the condition accepted by the first condition acceptance unit includes at least one of settings of a type of an object to be processed and a type of a reference object, and settings of a density of a pixel to be processed and a density of a reference pixel, and the condition accepted by the second condition acceptance unit includes at least one of a setting of a type of an object to be processed, and a setting of a density of a pixel to be processed.

4. The apparatus according to claim 1, wherein one of the trapping unit and the smoothing unit generates a processing completion flag in association with a processed pixel, and
   the other of the trapping unit and the smoothing unit skips processing for a pixel or a region associated with the processing completion flag.

5. The apparatus according to claim 1, further comprising a selector configured to selectively apply one of the trapping unit and the smoothing unit to respective pixels or regions of the object.

6. The apparatus according to claim 5, wherein the selector is further configured to selectively apply one of the trapping processing and the smoothing processing to respective pixels or regions of the object in dependence upon density of the pixel or region.

7. The apparatus according to claim 6, wherein the trapping unit is configured to apply trapping processing to a boundary where a density of at least one of a first object and a second object whose boundaries contact each other is equal to or higher than a predetermined density.

8. The apparatus according to claim 6, wherein the smoothing unit is configured to apply edge smoothing processing to a boundary where a density of at least one of a first object and a second object whose boundaries contact each other is equal to or lower than a predetermined density.

9. The apparatus according to claim 1, wherein the smoothing unit is configured, in a case where an object comprises at least one trapping portion to which trapping has been applied and at least one non-trapping portion to which trapping has not been applied, to apply edge smoothing processing to the at least one non-trapping portion.

10. The apparatus according to claim 1, wherein the smoothing unit is configured, in a case where an object comprises at least one trapping portion to which trapping has been applied and at least one non-trapping portion to which trapping has not been applied, to apply edge smoothing processing to the at least one non-trapping portion at a first intensity and to apply edge smoothing processing to the at least one trapped portion at a second intensity less than the first intensity.

11. The apparatus according to claim 1, further comprising a display unit configured to display a preview display of respective pixels or regions to which trapping processing and edge smoothing processing is to be applied.

12. The apparatus according to claim 11, wherein the display unit is configured to display respective pixels or regions to which trapping processing and edge smoothing processing are to be applied using different appearances or using simulation imaging.

13. The apparatus according to claim 11, wherein the display unit is configured to inhibit selection of an execution condition of one of the first and second condition acceptance unit in a case where the execution condition overlaps with an execution condition saved by the other condition acceptance unit.

14. The apparatus according to claim 1, further comprising:
   a dither processing unit configured to create an object of screen image data by applying dither processing to an object of contone image data,
   wherein the trapping unit applies the trapping processing to the object of the contone image data, and the smoothing unit applies the edge smoothing processing to the object of the screen image data.

15. The apparatus according to claim 14, wherein the smoothing unit applies the edge smoothing processing to the object of the screen image based on the contone image data and the screen image data.

16. The apparatus according to claim 15, wherein the contone image data and the screen image data are image data having process colors.

17. The apparatus according to claim 16, wherein the image data having the process colors are image data composed of cyan, magenta, yellow and black.

18. An image processing apparatus, which generates image data, an image of which is formed by overlapping color plates of at least two colors, comprising:
   a trapping unit configured to apply trapping processing to an object which belongs to either of the color plates of the at least two colors; and
   a smoothing unit configured to apply edge smoothing processing to an object which belongs to either of the color plates of the at least two colors, whereby as a result of such edge smoothing processing at least a portion of the object is rimmed,
   wherein a degree of intensity of the trapping processing by the trapping unit and a degree of intensity of the edge smoothing processing by the smoothing unit are relatively controlled for respective pixels or regions.

19. A method of controlling an image forming apparatus, which forms an image by overlapping color plates of at least two colors, the method comprising:
   applying trapping processing to an object which belongs to either of the color plates of the at least two colors; and
   applying edge smoothing processing to an object which belongs to either of the color plates of the at least two colors, whereby as a result of such edge smoothing processing at least a portion of the object is rimmed,
   wherein the trapping processing and the edge smoothing processing are exclusively controlled for respective pixels or regions.

20. The method according to claim 19, further comprising:
   creating an object of screen image data by applying dither processing to an object of contone image data,
   wherein the trapping processing is applied to the object of the contone image data in the trapping step, and
   the edge smoothing processing is applied to the object of the screen image data in the smoothing step.

21. The method according to claim 20, wherein the edge smoothing processing is applied to the object of the screen image in the smoothing step based on the contone image data and the screen image data.

22. The method according to claim 21, wherein the contone image data and the screen image data are image data having process colors.

23. The method according to claim 22, wherein the image data having the process colors are image data composed of cyan, magenta, yellow and black.

24. A non-transitory computer readable storage medium which stores a program therein for making a computer execute an image forming method of controlling an image forming apparatus, which forms an image by overlapping color plates of at least two colors, the method comprising:
   applying trapping processing to an object which belongs to either of the color plates of the at least two colors; and
   applying edge smoothing processing to an object which belongs to either of the color plates of the at least two colors, whereby as a result of such edge smoothing processing at least a portion of the object is rimmed,
   wherein the trapping processing and the edge smoothing processing are exclusively controlled for respective pixels or regions.

25. The non-transitory computer readable storage medium according to claim 24, wherein the method further comprises:
   creating an object of screen image data by applying dither processing to an object of contone image data,
   wherein the trapping processing is applied to the object of the contone image data, and
   the edge smoothing processing is applied to the object of the screen image data.

* * * * *